May 17, 1966 — H. CANCRINUS — 3,251,248
FLUID TORQUE TRANSMITTER
Filed Feb. 19, 1963 — 2 Sheets-Sheet 1

Hendrik Cancrinus,
INVENTOR.

BY Wenderoth, Lind
and Ponack, Attorneys

May 17, 1966  H. CANCRINUS  3,251,248
FLUID TORQUE TRANSMITTER
Filed Feb. 19, 1963  2 Sheets-Sheet 2

Hendrik Cancrinus,
INVENTOR.

BY Wenderoth, Lind
and Ponack, attorneys

United States Patent Office 3,251,248
Patented May 17, 1966

3,251,248
FLUID TORQUE TRANSMITTER
Hendrik Cancrinus, Cape Town, Cape Province, Republic of South Africa, assignor to Inpower Works (Proprietary) Limited, South West Africa
Filed Feb. 19, 1963, Ser. No. 259,508
Claims priority, application Republic of South Africa, Feb. 26, 1962, 62/790
12 Claims. (Cl. 74—752)

This invention relates to a fluid torque transmitter.

According to the invention a torque transmitter comprises a carrier, at least one planet wheel mounted in the carrier to rotate about its own axis, a drum around the carrier and coaxial with the carrier and a second axis, the carrier and drum being mounted to rotate about the second axis, a frame member rotatably supporting the carrier and drum, drive connecting means connected to the carrier for connecting the carrier to a source of rotary power, a sun wheel coaxial with the second axis, connecting means connected to the sun wheel for connecting the sun wheel to a load to absorb rotary power, intermediate drive means drivingly connecting the planet wheel with the sun wheel, a plurality of liquid entrapping means fast with the planet wheel and defining recesses spaced circumferentially away from and around the planet wheel axis, an inwardly open annular channel fast with the carrier, and coaxial with the carrier and the drum and having an opening directed axially of the carrier towards the recesses for discharging liquid from the channel into the recesses, and a duct within the drum and supported by the frame member, the duct having a fluid inlet opening at or near the drum periphery and a fluid outlet opening directed into the annular channel; whereby when a quantity of liquid is placed in the drum and when the drum rotates, the liquid is flung out in an annular layer against the inner peripheral surface of the drum under the action of centrifugal force during rotation of the drum about its axis, and whereby the liquid entrapping means during rotation of the planet wheel relative to the drum, pass through the layer of flung out liquid to receive liquid into them, and whereby previously received liquid in recesses in the region of the carrier axis is released in a direction outwardly from the carrier axis towards the annular layer, and whereby liquid from the annular layer flows into the duct inlet opening and out of the duct outlet opening into the annular channel and thence out of the sidewardly directed channel openings into the recesses.

The intermediate drive means may include toothed planet and sun wheels meshing directly, or it may be arranged to transmit torque developed about the planet wheel axis to have the same direction about the carrier axis. The planet wheels and the sun wheel may be toothed gear wheels and the intermediate drive train may comprise toothed idler wheels in mesh with planet and sun wheels, and may be mounted to rotate relative to the carrier about axes parallel to the carrier axis. Alternatively, the planet and sun wheels may comprise chain sprockets and the intermediate drive means may comprise a drive chain in mesh with the sprockets.

The duct may be pivotally mounted in the frame member and may have adjusting means whereby the depth of immersion of the inlet opening of the duct in an annular layer of liquid may be adjusted and whereby the rate of diversion of liquid from the annular layer in the drum to the annular channel may be controlled.

The drum may be fast or integral with the carrier and may have drive connecting means for connecting it to a source of rotary power, or the drum may be freely rotatably mounted for rotation about the drum cum carrier axis, and the carrier may have drive connecting means for connecting it to a source of rotary power.

The liquid entrapping means may comprise a bucket wheel fast with the planet wheel and comprising a disc, a plurality of buckets or containers spaced circumferentially around the planet wheel axis and extending axially from the disc and defining the recesses, and the annular channel planet wheel opening may be defined by walls extending towards the disc, and extending inwardly beyond the ends of the buckets and at a smaller radius from the bucket wheel axis than the buckets.

A further feature of the invention provides holes or perforations in the containers such that fluid will flow out of the containers under centrifugal force at a rate which may be less than or equal to the capacity of the duct or which may be more. The holes or perforations may be provided such that fluid will flow from one container into the next i.e. in series. Alternatively, the holes may be provided in the sides of the containers so that fluid discharges directly to the annular layer.

The ratio between planet wheel and sun wheel pitch diameters is conveniently not less than one half, the degree of eccentricity of the containers to the planet wheel axes not exceeding the distance between the planet wheel axis and carrier cum drum axis. The ratio is preferably of the order of unity.

The invention will now be described with reference to the accompanying diagrammatic drawings.

Figures 1, 3, 4:
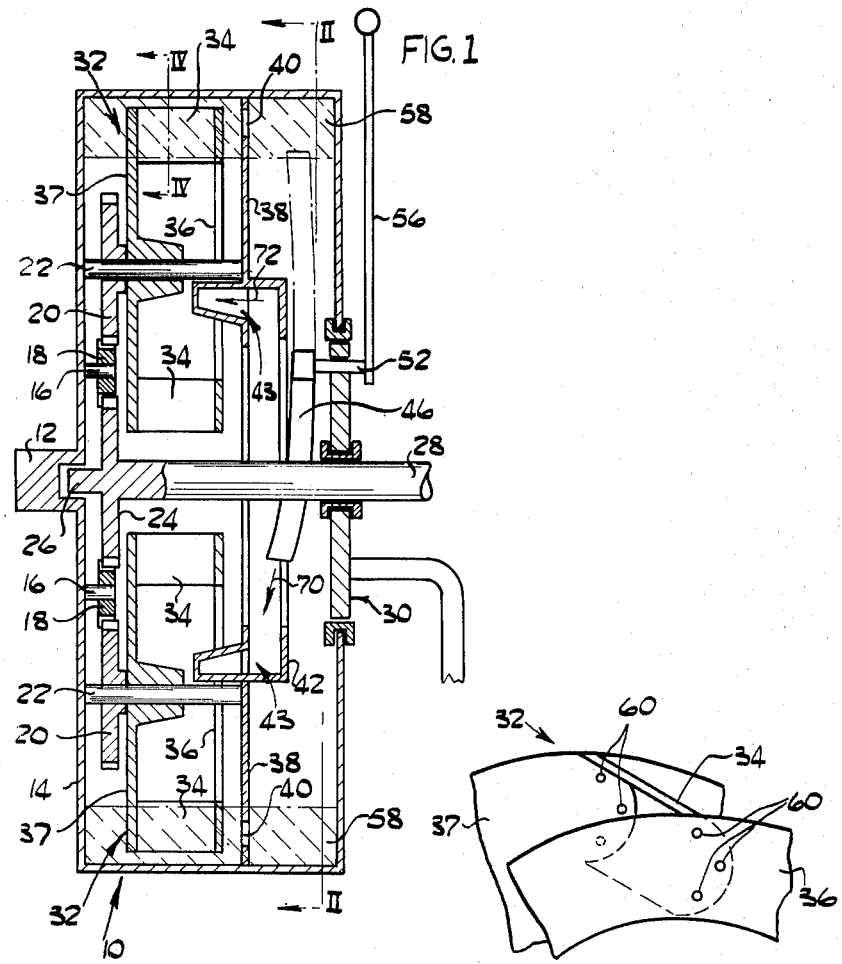
FIGURE 1 shows a sectional side elevation at I—I in FIGURE 2.
FIGURE 3 shows a detail of a container having side holes or perforations.
FIGURE 4 shows a detail in section of containers having bottom holes or perforations at IV—IV in FIGURE 1.
Figure 2:
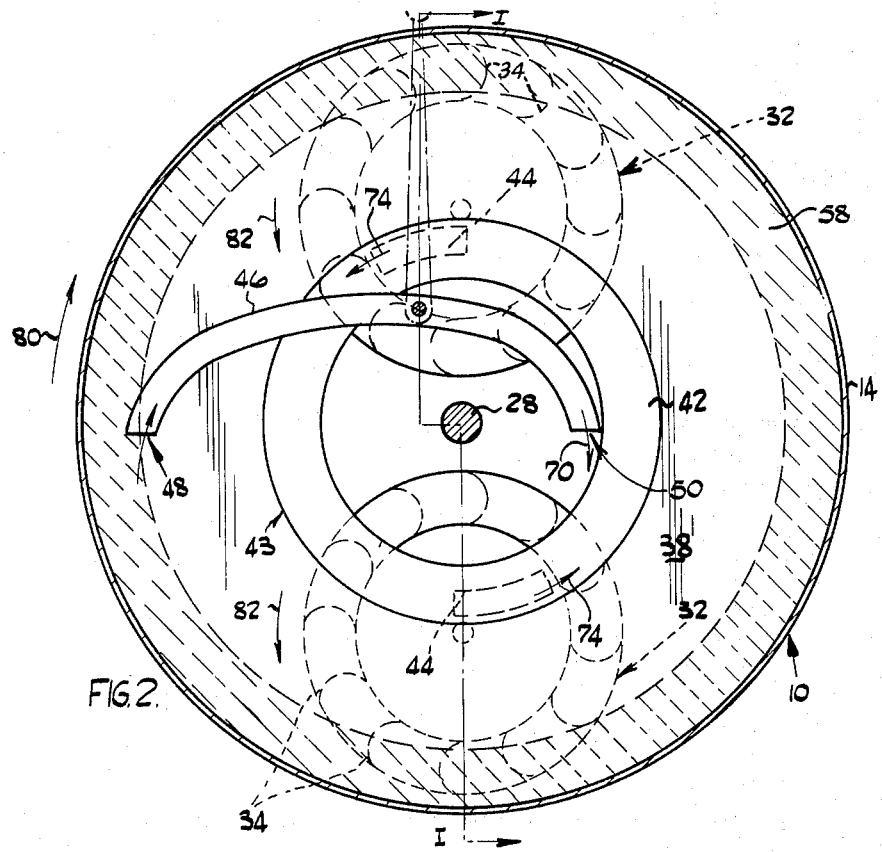
FIGURE 2 shows a sectional end elevation at II—II in FIGURE 1.

Referring to FIGURES 1 to 4 of the drawings reference numeral 10 refers generally to a torque transmitter comprising an input shaft 12 fast with drum 14 which also forms a carrier, and which carries pins 16 supporting gear-toothed idlers 18 meshing with planet wheels 20 supported by pins 22 fast with drum cum carrier 14. Coaxial with drum cum carrier 14 and input shaft 12, is provided sun wheel 24 meshing with the idlers 18 and having a coaxial stub axle 26 supported in a socket provided in drum cum carrier 14. The sun wheel 24 also has an output shaft 28 coaxial with it. This shaft 28 is rotatably supported in bearings in frame member 30. Planet and sun wheel teeth are equal in number.

Fast with the planet wheel 20, there are provided bucket wheels 32 having each a plurality of buckets 34 spaced circumferentially in dynamic balance about the planet wheel axis. A container 34 is of C-section and is located between two discs one of which is annular, namely 36 and the other of which, 37, is fast with the planet wheel 20.

Drum cum carrier 14 has fast with it an inner partition 38 having openings 40 around the outside. Fast with this partition is provided an annular ring 42 of angle section to form an annular inwardly open channel 43 coaxial with the drum. The partition 38 has openings 44 (see FIGURE 2) out of the channel directed transversely to the planet wheel axis so as to permit outcoming fluid to enter the buckets trailing the movement of the carrier. Flow of liquid takes place out of outlet opening 50 of duct 46, in direction of arrow 70, thence axially of the carrier in direction of arrow 72 (see FIGURE 1) and transversely in the direction of arrow 74 (see FIGURE 2) into buckets 34. It will be noted from FIGURE 2 that these buckets trail the direction of rotation of the drum cum carrier 14.

The duct 46 has a fluid inlet opening 48 and a fluid outlet opening 50, the duct being fast with pin 52 mounted to pivot in frame member 30. The pin 52 has fast with it a handle 56 whereby the depth, to which the inlet opening 48 can be immersed in annular layer 58 of fluid in the drum cum carrier 14 may be adjusted.

Referring to FIGURE 3, reference numeral 60 refers to side openings or holes to permit fluid to bleed out of the container under centrifugal force.

Referring to FIGURE 4, reference numeral 62 refers to bottom openings in the bottoms of the containers 34. The arrows 64 indicate the direction of centrifugal force upon fluid 66 in the containers and directed away from the region of the carrier axis. It will be noted that fluid from one container will flow into the next and so on.

For operation, hydraulic fluid is placed inside the drum and the input shaft connected to a prime mover and the output shaft is connected to a load.

As soon as rotary power is applied to the input shaft, the hydraulic fluid is flung out in an annular layer 58 and this layer in rotating will exert a drag on the bucket wheels 32 and so transmit a torque to the output shaft. Rotation of the drum in the direction of arrow 80 while the output shaft is stationary or rotates at less than input speed causes planet wheels 20 to rotate about their axes relative to the carrier 14 in the direction of arrow 82, thus causing buckets 34 to pass through layer 58, and to receive some fluid from the layer 58 into them. Centrifugal force directed away from the region of the drum axis, acting on this liquid will exert a moment on each bucket wheel about its axis. This moment is transmitted to the sun wheel 24 via idlers 18, and is available as a driving torque on the output shaft.

The planet wheel conveniently has the same pitch diameter as the sun wheel. This ensures that, at starting when the sun wheel is stationary, the planet wheel, meshing with an idler meshing with the sun wheel, will rotate once in a direction opposite to that of the carrier for every rotation of the carrier about its axis. The planet wheel will then perform a motion which may be termed circular translation. In other words, a bucket which is in, say, the 9 o'clock position relative to its axis, will maintain that position relative to its axis throughout its orbit about the carrier axis. This will ensure that centrifugal force as a result of carrier rotation about its axis, will be effective for the generation of useful torque and there will be little centrifugal force as a result of rotation of the planet wheel about its axis and which is not effective for the generation of useful torque.

At full speed, that is at direct drive, the planet wheels no longer rotate about their own axes but rotate in unison with the drum, annular layer of liquid, and ouput shaft about the drum axis.

If a balance is found between the torque generated by the fluid in the bucket wheels and the torque due to load on the output shaft, input and output shafts will rotate at the same speed. If this torque is not the maximum torque for which the coupling is designed, then by adding fluid via duct 46 through opening 44 into the containers of the planet wheels an extra torque capacity will be obtained and an increased speed of the output shaft, and hence overdrive can result.

When input shaft and output shaft rotate at the same speed, the input torque balances the load torque. Sufficient liquid only will have been entrapped from the layer 58 by the buckets, on the trailing side of the planet wheel relative to the direction of rotation of the carrier 14, to generate torque under the action of centrifugal force to balance the load torque. As previously mentioned, during direct drive, the planet wheels do not rotate about their axes relative to the carrier. The buckets will, however, still be able to receive more liquid, because the machine is not working at full capacity. More liquid can therefore be fed into the buckets from the annular layer of liquid 58 via the duct 46 and the annular channel 43. Such liquid, due to the extra mass, will result in an increased torque being generated about the planet wheel axis under the action of centrifugal force, and will cause the planet wheels to rotate about their axes relative to the carrier, in a direction opposite to that shown by arrow 82. This increased torque is transferred to the output shaft via the intermediate drive means, thereby causing the output shaft to speed up and resulting in overdrive.

If holes are provided in the buckets as shown in FIGURES 3 and 4 then a velocity ratio between input and output shafts can be provided less, equal to, or greater than unity, by suitably regulating the depth of opening 48 in layer 58 to deliver fluid into the buckets at a rate less than the rate of fluid loss from them, at a rate equal to the rate of fluid loss, or at a rate greater than the rate of fluid loss from them.

If holes are provided in the buckets without means to feed liquid into them, then there will always be some slip between input and output shafts because the planet wheel will have to rotate slowly to bring liquid from the annular layer 58, thereby to maintain constant the mass of liquid on the trailing side of the planet wheel relative to the direction of rotation of the carrier, in order to generate sufficient torque to drive the load on the output shaft. However, in accordance with the invention, this make-up of fluid mass on the trailing side of the planet wheel is effected by feeding in liquid from the annular layer 58 via the duct 46 and the channel 43. By regulating this rate of feed relative to the rate of liquid loss, the output shaft can be regulated to rotate slower than the input shaft, i.e. when rate of feed is less than the rate of liquid loss from the buckets, or can be regulated to rotate at the same speed as the input shaft, i.e. when the rate of feed is equal to the rate of liquid loss; or can be regulated to rotate faster than the input shaft when the feed rate exceeds the rate of liquid loss.

A machine having holes in the bottoms of the buckets can have a constant speed characteristic independent of load torque. Thus for example, for a given output speed, as load torque increases, so more and more liquid can be fed into the buckets until the maximum torque capacity of the machine at its input speed is reached. When holes are provided in the bottoms of the buckets, liquid will discharge from some buckets in the direction of arrows 62 into others. When holes are provided in the sides of the buckets, then liquid bleeding from those buckets is not discharged into other buckets.

It will be apparent from inspection of FIGURE 1, that a carrier fast with the input shaft can be provided, and a drum coaxial with input and output shafts around it and mounted to be freely rotatable about its axis around the carrier. The invention extends also to such a construction of transmiter. If the carrier is driven to rotate in direction of arrow 80, then the drum will also rotate in that direction whether fast with or loose around the carrier. The bucket wheels 32 will then rotate about their axes and through layer 58, in the direction shown by arrow 82, when the output shaft rotates at a speed less than that of the input shaft.

Figure 5:
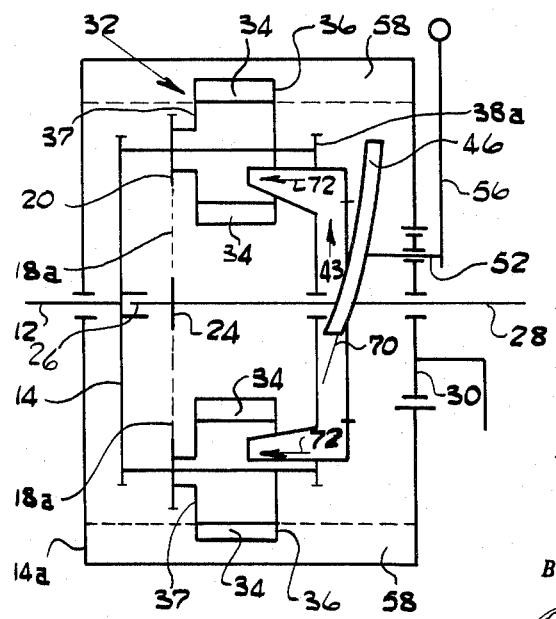
FIGURE 5 shows a sectional side elevation of another embodiment of the invention.

Referring now to FIGURE 5 of the drawings, there is shown an alternative embodiment of the invention in sectional side elevation. In this embodiment (unlike that of FIGURES 1 and 2 where the carrier and drum are integral) the drum 14a is mounted to be freely rotatable about its axis coaxial with the shafts 12 and 28, and relative to the carrier 14. In other respects the construction can be the same as that shown in FIGURE 1, including the provision of toothed gear wheels. Partition 38a is fast with the carrier.

Intermediate drive means in the form of sprockets and meshing chains 18a may be provided instead of idler gear wheels, for both the fast and loose drum embodiments.

I claim:

1. A torque transmitter which comprises a carrier, at least one planet wheel mounted in the carrier to rotate about its own axis, a drum around the carrier and co-axial with the carrier and a second axis, the carrier and drum being mounted to rotate about the second axis, a frame member rotatably supporting the carrier and drum, drive connecting means connected to the carrier for connecting the carrier to a source of rotary power, a sun wheel coaxial with the second axis, connecting means connected to the sun wheel for connecting the sun wheel to a load to absorb rotary power, intermediate drive means drivingly connecting the planet wheel with the sun wheel, a plurality of liquid entrapping means fast with the planet wheel and defining recesses spaced circumferentially away from and around the planet wheel axis, an inwardly open annular channel fast with the carrier, and coaxial with the carrier and the drum and having an opening directed axially of said carrier towards the recesses for discharging liquid from the channel into the recess, and a duct within the drum and supported by the frame member, the duct having a fluid inlet opening at or near the drum periphery and a fluid outlet opening directed into the annular chanel; whereby when a quantity of liquid is placed in the drum and when the drum rotates, the liquid is flung out in an annular layer against the inner peripheral surface of the drum under the action of centrifugal force during rotation of the drum about its axis, and whereby the liquid entrapping means during rotation of the planet wheel relative to the drum, pass through the layer of flung out liquid to receive into them, and whereby previously received liquid in recesses in the region of the carrier axis is released in a direction outwardly from the carrier axis towards the annular layer, and whereby liquid from the annular layer flows into the duct inlet opening and out of the duct outlet opening into the annular channel and thence out of the sidewardly directed channel openings into the recesses.

2. A torque transmitter according to claim 1 in which a plurality of planet wheels are provided mounted in dynamic balance about the carrier axis.

3. A torque transmitter according to claim 2 in which the planet wheels and sun wheels are toothed gear wheels and in which the intermediate drive means are toothed idler wheels in mesh with the planet and sun wheels, and mounted to rotate relative to the carrier about axes parallel to the carrier axis.

4. A torque transmitter according to claim 2 in which the intermediate drive means is arranged to apply torque developed about the axis of the planet wheel in the same direction about the second axis.

5. A torque transmitter according to claim 4 in which the planet and sun wheels are chain sprockets and in which the intermediate drive means includes chains in mesh with the planet and sun wheels.

6. A torque transmitter according to claim 4 in which the ratio between planet wheel and sun wheel pitch diameters is not less than one half, the degree of eccentricity of the liquid entrapping means to the planet wheel axes not exceeding the distance between the planet wheel axis and carrier cum drum axis.

7. A torque transmitter according to claim 6 in which the ratio is of the order of unity.

8. A torque transmitter according to claim 1 in which the duct is pivotally mounted in the frame member and has adjusting means whereby the depth of immersion of the inlet opening of the duct in an annular layer of liquid may be adjusted and whereby the rate of diversion of liquid from the annular layer in the drum to the annular channel may be controlled.

9. A torque transmitter according to claim 1 in which the drum is fast with the carrier and integral with it.

10. A torque transmitter according to claim 1 in which the drum is mounted to be freely rotatable relative to the carrier about the carrier axis.

11. A torque transmitter according to claim 1 in which the liquid entrapping means comprises a bucket wheel fast with the planet wheel and comprising a disc, a plurality of buckets spaced circumferentially around the planet wheel axis and extending axially from the disc and defining the recesses, and in which the axially directed opening of the annular channel is defined by walls extending towards the disc, and extending axially beyond the ends of the buckets and at a smaller radius from the bucket wheel axis than the buckets.

12. A torque transmitter according to claim 11 in which at least some of the buckets have perforations to permit leakage of fluid out of the buckets during operation and hence to provide some slip between rotary power source and load at or near full load speed.

References Cited by the Examiner

UNITED STATES PATENTS

| 1,568,639 | 1/1926 | Swart | 74—774 |
| 1,666,152 | 4/1928 | Strigl | 74—774 |
| 1,691,610 | 11/1928 | Reece et al. | 74—752 |
| 1,691,612 | 11/1928 | Reece et al. | 74—752 |
| 1,882,222 | 10/1932 | Lewis | 192—61 X |
| 3,077,793 | 2/1963 | Cancrinus | 74—752 |

FOREIGN PATENTS 1,052,824   9/1953   France.

DAVID J. WILLIAMOWSKY, *Primary Examiner.*

DON A. WAITE, *Examiner.*

T. C. PERRY, *Assistant Examiner.*